(12) United States Patent
Field

(10) Patent No.: US 9,210,222 B2
(45) Date of Patent: Dec. 8, 2015

(54) BROWSER COOKIE ANALYSIS AND TARGETED CONTENT DELIVERY

(71) Applicant: Adobe Systems Incorporated, San Jose, CA (US)

(72) Inventor: Kimen Catherine Field, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 203 days.

(21) Appl. No.: 13/799,733

(22) Filed: Mar. 13, 2013

(65) Prior Publication Data

US 2014/0280816 A1 Sep. 18, 2014

(51) Int. Cl.
H04L 29/08 (2006.01)
G06F 17/30 (2006.01)
G06F 15/173 (2006.01)

(52) U.S. Cl.
CPC ............... *H04L 67/14* (2013.01); *H04L 67/02* (2013.01); *H04L 67/20* (2013.01); *H04L 67/22* (2013.01); *G06F 17/30861* (2013.01); *G06F 17/30867* (2013.01)

(58) Field of Classification Search
CPC .............. G06F 9/547; G06F 17/30867; G06F 17/30861
USPC ............. 709/223–224; 726/10, 30; 705/14.66
See application file for complete search history.

(56) References Cited

U.S. PATENT DOCUMENTS 6,393,479 B1 5/2002 Glommen et al.
6,714,926 B1 3/2004 Benson
6,851,060 B1 * 2/2005 Shrader .......................... 726/10
8,019,777 B2 * 9/2011 Hauser .......................... 707/769
8,108,423 B2 * 1/2012 Treat et al. .................... 707/771
2005/0192873 A1 9/2005 Roche et al.
2007/0088805 A1 4/2007 Cyster
2007/0147685 A1 * 6/2007 Ericson ......................... 382/225
2012/0130819 A1 * 5/2012 Willcock et al. ........... 705/14.66
2014/0019845 A1 * 1/2014 Boullery, Didier ........... 715/234

OTHER PUBLICATIONS

Junghoon Oh, et al., "Advanced evidence collection and analysis of web browser activity", Digital Investigation 8, pp. S62-S70 (2011).

* cited by examiner

*Primary Examiner* — David Lazaro
*Assistant Examiner* — Zi Ye
(74) *Attorney, Agent, or Firm* — Finch & Maloney PLLC

(57) ABSTRACT

Techniques are disclosed for collecting, analyzing and compiling information stored in browser cookies, and using such information to deliver web content targeted to a particular user or audience. A browser cookie is a data structure that is stored on a user's computer and that can contain information regarding that user's previous web browsing activity. In one embodiment, information collected from browser cookies is analyzed and compiled so as to allow such information to be selectively correlated with web content stored in a targeted content repository. For example, browser cookie data indicating that a user has visited websites that sell airline tickets may be correlated with a banner advertisement for travel insurance. Once such a correlation is established, the targeted content—for example, the aforementioned travel insurance advertisement—can subsequently be delivered to future website visitors whose computers store browser cookies containing data identified as being correlated with such targeted content.

18 Claims, 7 Drawing Sheets

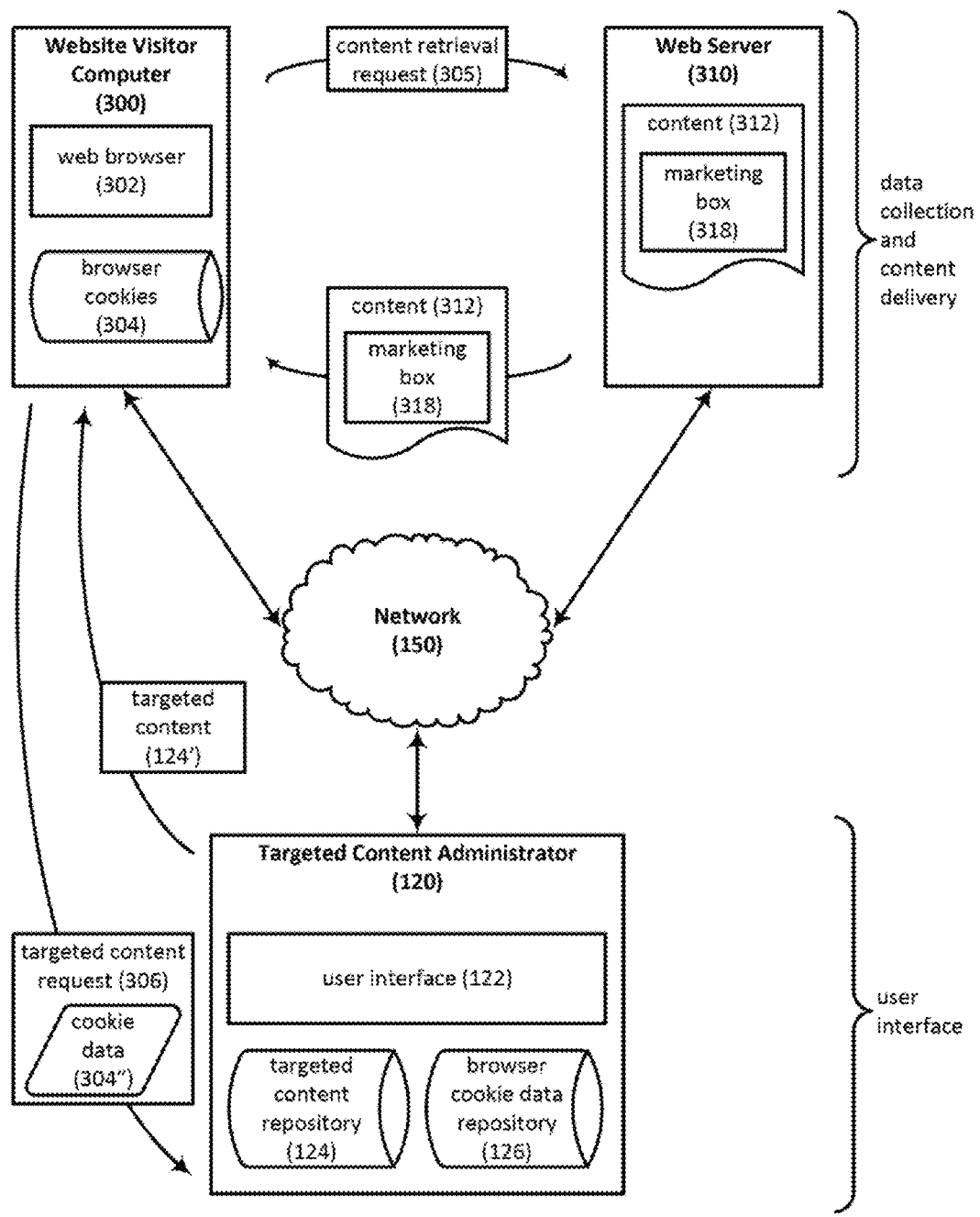

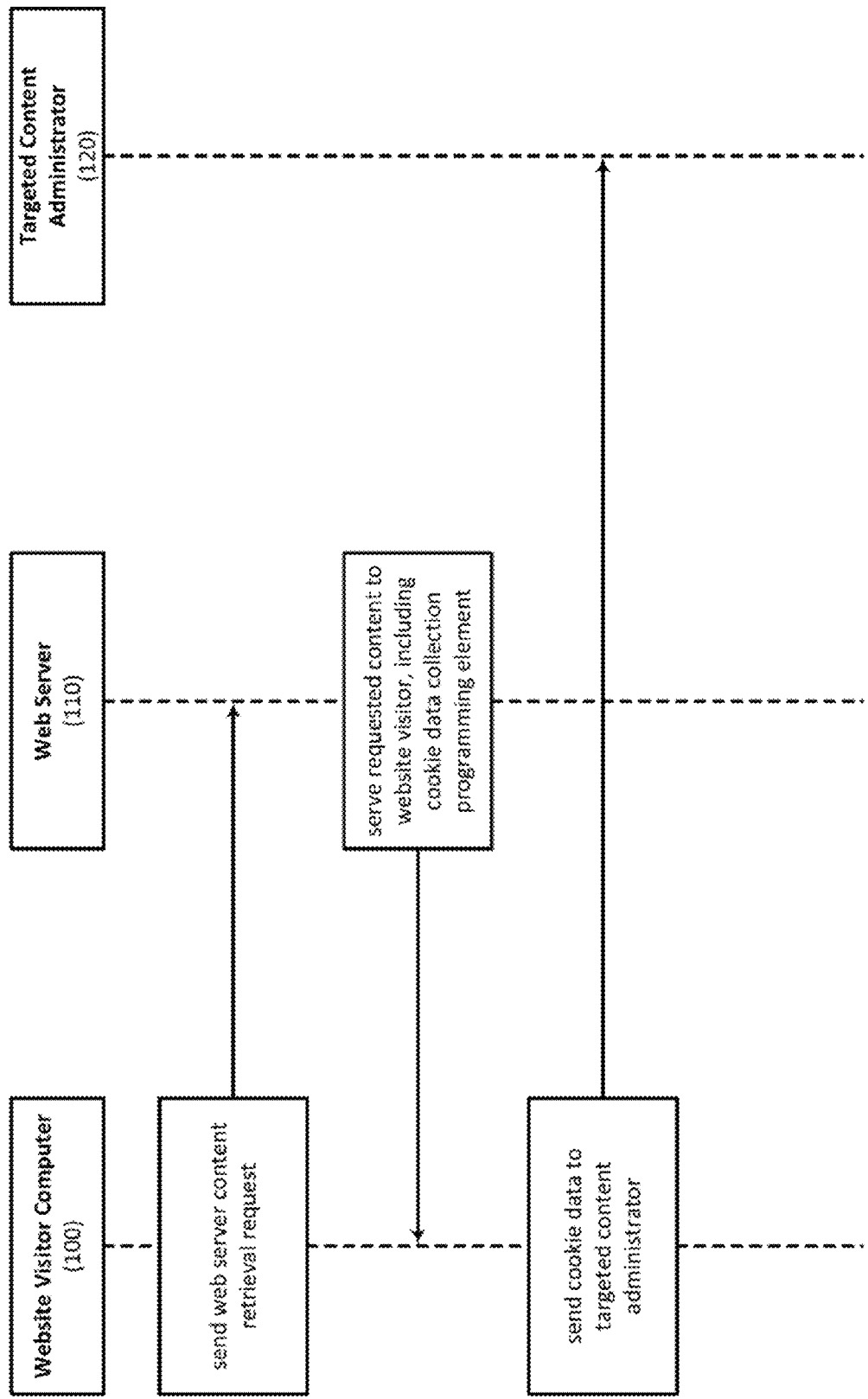

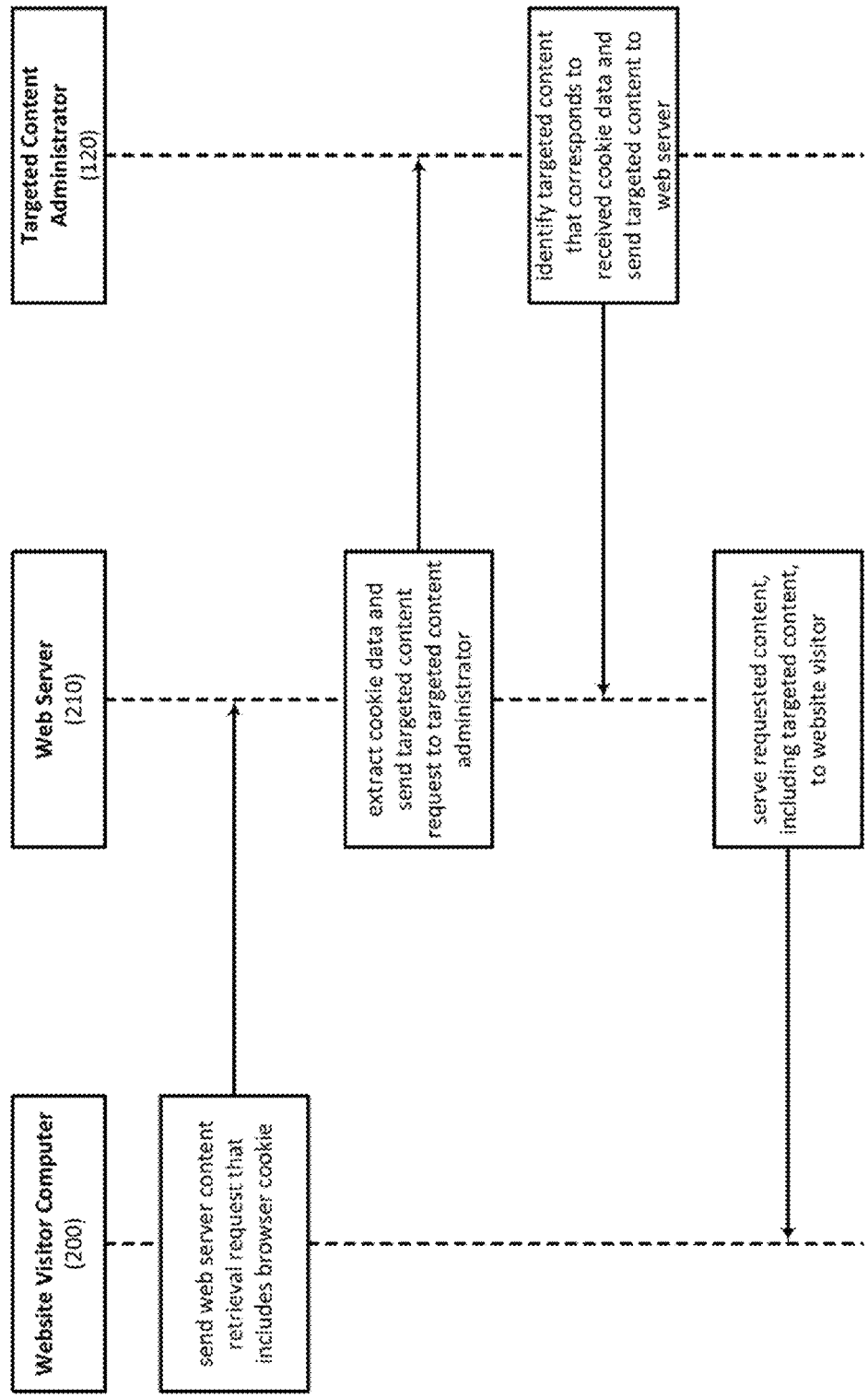

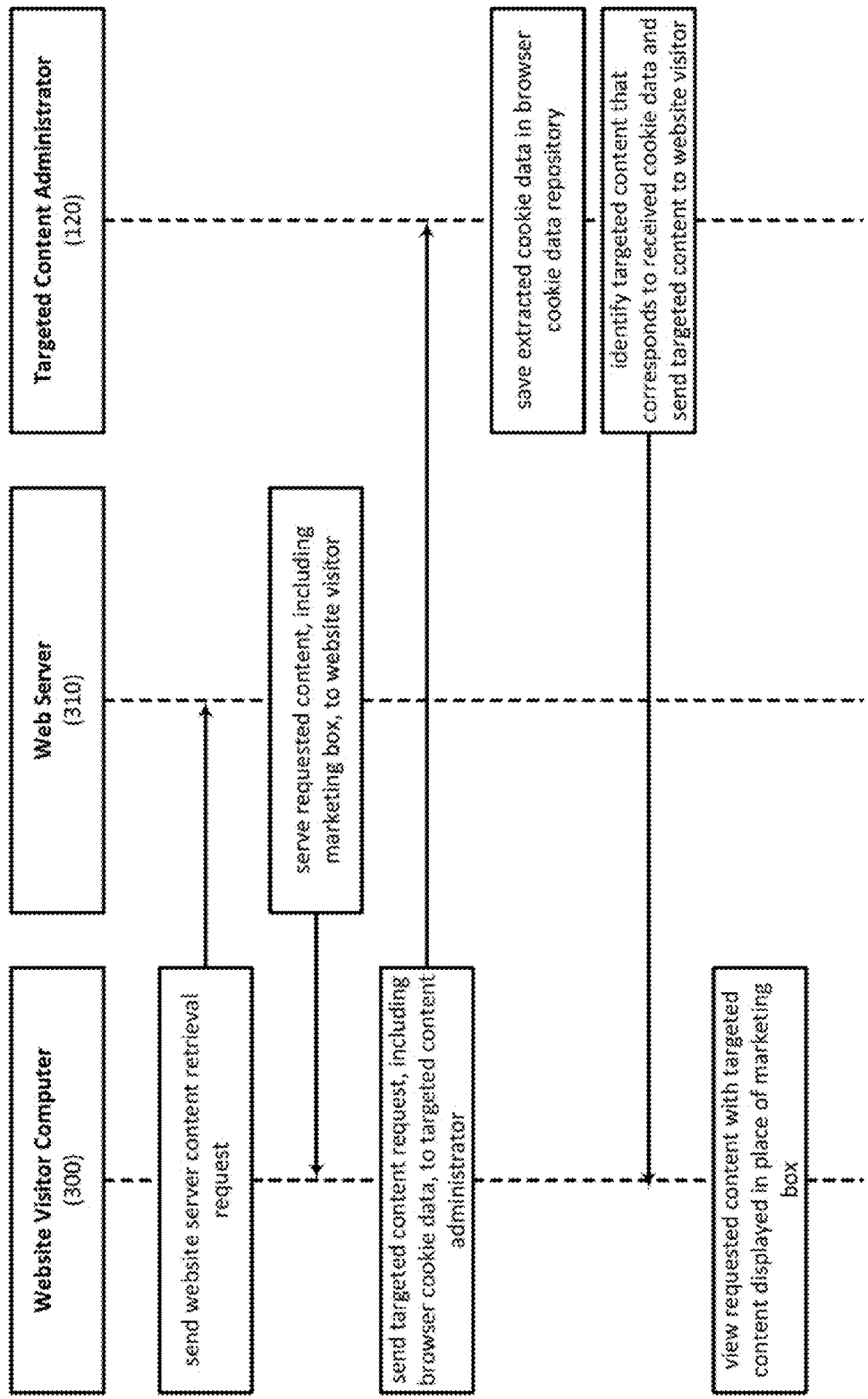

BROWSER COOKIE ANALYSIS AND TARGETED CONTENT DELIVERY

FIELD OF THE DISCLOSURE

This disclosure relates generally to the delivery of web content that is targeted to a particular user or audience, and more specifically, to techniques for analyzing web browser cookies to improve the process of delivering such targeted content.

BACKGROUND

As the number of people with access to the Internet continues to grow, websites have become an increasingly important way for businesses and consumers to interact. For example, businesses routinely use websites to distribute information about products and services, conduct advertising and public relations campaigns, and transact business by receiving orders and payments. As a result, website owners often devote substantial resources to analyzing the characteristics and activities of the visitors to their webpages. This analysis, which is generally referred to as website traffic analysis, has been used to support the development of webpages that include dynamically-generated content that is specifically targeted toward a particular user or audience.

BRIEF DESCRIPTION OF THE DRAWINGS

FIG. 1C is a block diagram schematically illustrating selected components of a system for analyzing information contained in browser cookies stored on a website visitor computer, correlating that information with selected web content, and delivering targeted content to the website visitor computer in accordance with an embodiment of the present invention.

FIG. 2A illustrates a methodology for collecting browser cookie data in the context of the online environment illustrated in FIG. 1A, in accordance with an embodiment of the present invention.

FIG. 2B illustrates a methodology for delivering targeted content to a website visitor computer in the context of the online environment illustrated in FIG. 1B, in accordance with an embodiment of the present invention.

FIG. 2C illustrates a methodology for collecting browser cookie data and delivering targeted content to a website visitor computer in the context of the online environment illustrated in FIG. 1C, in accordance with an embodiment of the present invention.

DETAILED DESCRIPTION

Figure 1A:
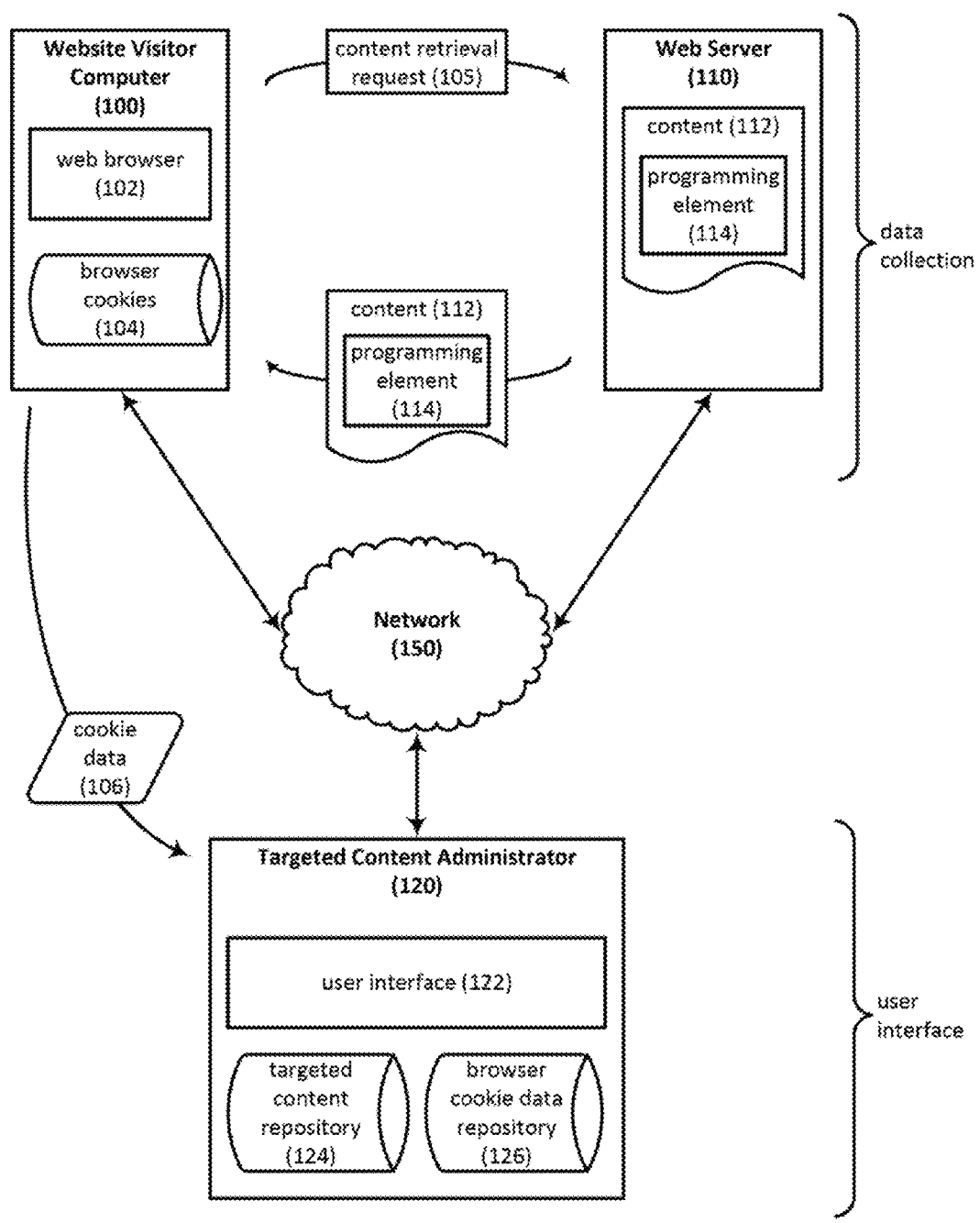
FIG. 1A is a block diagram schematically illustrating selected components of a system for analyzing information contained in browser cookies and correlating that information with selected web content in accordance with an embodiment of the present invention.

Techniques are disclosed for collecting, analyzing and compiling information stored in browser cookies, and using such information to generate and deliver web content that is targeted to a particular user or audience. A browser cookie is a data structure that is stored on a user's computer and that can contain information regarding that user's previous web browsing activity. In one embodiment of the present invention, information collected from browser cookies is analyzed and compiled in a way that allows such information to be selectively correlated with web content stored in a targeted content repository. For example, browser cookie data indicating that a user has visited websites that sell airline tickets may be correlated with a banner advertisement for travel insurance. Once such a correlation is established, the targeted content—for example, the travel insurance advertisement—can subsequently be delivered to future website visitors whose computers store browser cookies containing data identified as being correlated with such targeted content. Numerous configurations and variations of such techniques will be apparent in light of this disclosure.

As used herein, the term "content" refers, in addition to its ordinary meaning, to information at least partially intended for display on a display device. Content also may include information not specifically intended for display, including software, executable instructions, scripts, hyperlinks, addresses, pointers and formatting information. The use of the term content is independent of the nature of the particular device used to display the content or the software application used to render the content. The term "targeted content" refers to content which is targeted or otherwise intended, optimized or prepared for a specific user, or audience or other group.

General Overview

The rapid growth of the Internet has presented advertisers and merchandisers with both opportunities and challenges. The large number of people with access to the internet allows business owners to reach a far larger and more diverse audience of potential customers than ever before. However, this vast audience has attracted a commensurately large number of businesses attempting to reach those potential customers, each attempting to set itself apart from the competition. Adding to this challenge is the fact that business owners often have limited information with respect to the people who see their advertising, respond to their advertising, and visit their websites. These factors have added to the challenge that business owners face in targeting their online marketing efforts to the individuals who are likely to be interested in the product or service being offered. To address these challenges, systems have been developed which attempt to associate a user's online activities with products and/or services in which the user is likely to be interested, thus allowing targeted marketing messages to be delivered to the user. For instance, a webpage may include a "marketing box" which serves as a placeholder for targeted content to be displayed. Thus, a user with a browsing history that indicates an interest in baseball may have an advertisement for baseball tickets appear in the marketing box, while a user with a browsing history that indicates an interest in cooking may have an advertisement for a cooking school appear in the marketing box. Such systems allow businesses to increase the likelihood of attracting consumers by generating marketing messages that are targeted to a specific audience.

One aspect of such systems is the ability of a web server to have access to information about a user's browsing activities. The hypertext transfer protocol (HTTP) that provides the foundation for most data communication on the world wide web is a stateless protocol, meaning that a web server alone cannot remember information about a particular user that accesses content stored on that server. To address this, commercially available web browsers are configured to store such information using "browser cookies", which are also sometimes referred to as HTTP cookies, web cookies, or simply, cookies. A browser cookie is a data structure that is stored on a user's computer and that contains information regarding the user's web browsing activity. By accessing the information stored in a browser cookie that is saved on a user's computer, a web server can obtain information regarding the web browsing history of that particular user.

The information provided in a browser cookie is stored in the form of one or more name-value pairs, a uniform resource locator (URL) or range of URLs to which the browser cookie corresponds, and an optional expiration date. For example, a browser cookie might contain the following information provided with the following syntax:

cookie="test=yes; expires=Thu, 10 Jan. 2019 02:06:13 UTC; path=example.org/"

When a user requests, via a web browser, a URL that corresponds to a browser cookie stored on the user's computer (such as the URL "example.org" in the above example), the web browser automatically sends the cookie to the appropriate web server with the URL request. Scripts running on the web server can then read the cookie, for example by retrieving the value (for example, "yes") associated with a particular name (for example, "test") defined in a name-value pair within the browser cookie, and the use such information as desired. A variety of different programming languages can be used to create, read, erase and otherwise manipulate browser cookies; examples of such languages include but are not limited to JavaScript, Perl and PHP, for instance.

Currently, website owners create cookies using both their own technologies as well as technologies developed by third parties. To this end, cookies including the same URL domain as the web site owner that created the cookie are referred to as "first-party cookies", while cookies including a different URL domain are referred to as "third-party cookies". Currently, first party cookies can be read/accessed through browser technologies like JavaScript. However, capturing this information collectively and making it actionable beyond the originating technology is nonetheless difficult. For instance, existing technologies have not made it possible to compile first-party cookie information in a way that allows such information to be readily correlated with content that is appropriate for the particular browsing history which is indicated by such cookie information.

Thus, and in accordance with an embodiment of the present invention, techniques are provided herein that facilitate the process of delivering web content that is targeted to a particular user or audience. Such techniques generally involve an initial process of collecting, analyzing and compiling information stored in browser cookies, and then selectively correlating such information with web content stored in a targeted content repository. The process of selectively correlating the cookie information with the targeted content can be accomplished, for example, with a user interface that allows particular web content to be associated with particular cookie values.

For instance, in one example embodiment, the techniques disclosed herein are implemented in a system that generally includes a data collection portion, a content delivery portion, and a user interface portion. The data collection portion of the system is programmed or otherwise configured to determine the information stored in visitor cookies through normal website visitor traffic. FIG. 1A illustrates an example embodiment of how a website visitor computer 100 and a web server 110 can interact to collect information from browser cookies 104 stored on the website visitor computer 100. The information collected from the browser cookies is referred to herein as "cookie data", and is indicated by reference numeral 106 in FIG. 1A. Cookie data may comprise, for example, URLs that the website visitor has browsed and name-value pairs associated with the website visitor, such as address, date of birth or other user profile information.

Figure 1B:
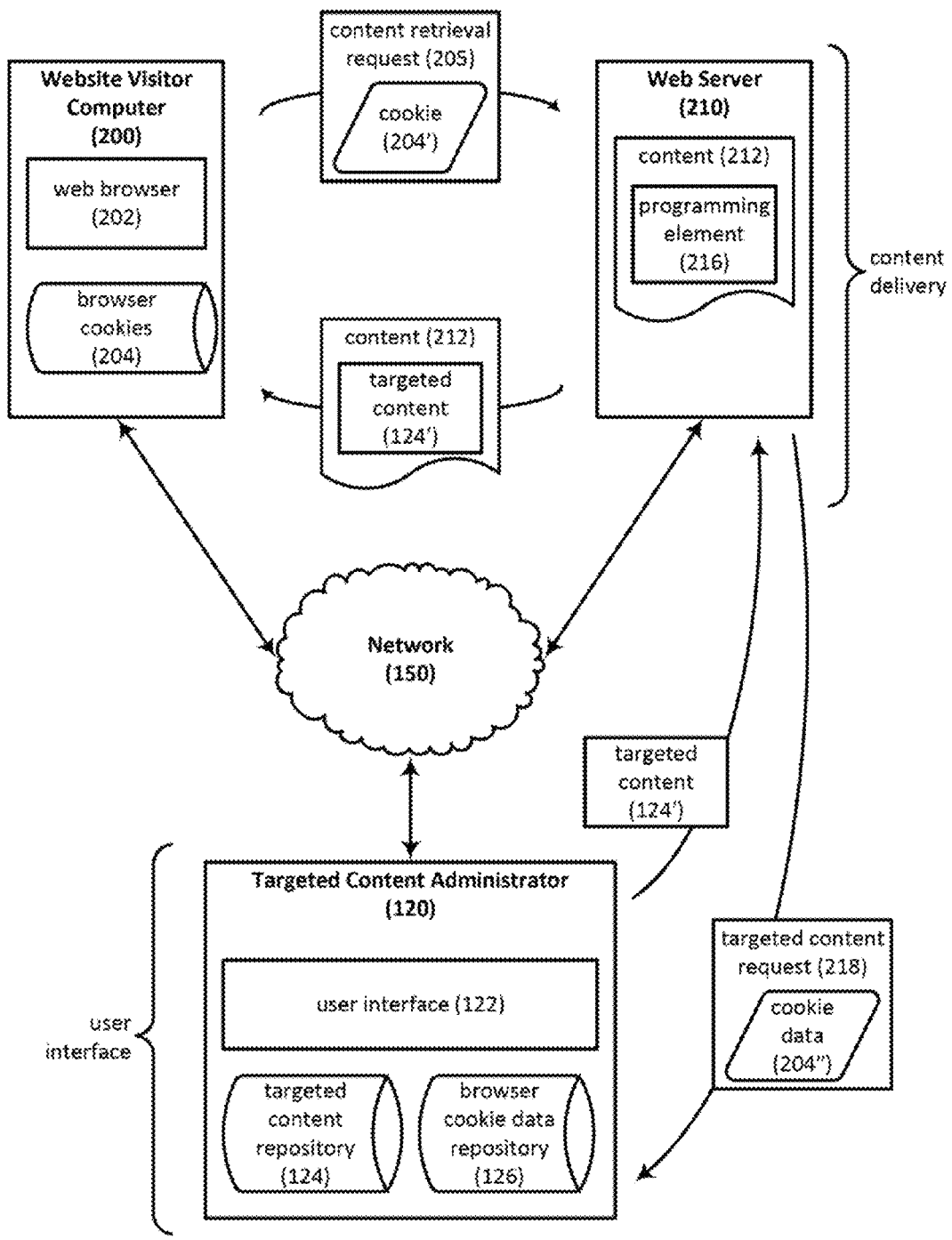
FIG. 1B is a block diagram schematically illustrating selected components of a system for delivering targeted content to a website visitor in accordance with an embodiment of the present invention.

This collected cookie data can be exposed in the user interface portion, which can be provided, for example, by the targeted content administrator 120 illustrated in FIGS. 1A and 1B. The targeted content administrator 120 allows a user, such as a digital marketer, to specify values defined in a cookie name-value pair as the criteria by which targeted content is delivered to a website visitor. For example, a digital marketer may specify a certain postal code defined in a cookie name-value pair as the criteria by which a particular advertisement is to be delivered. In some embodiments, the targeted content administrator 120 may be further configured to automatically establish such correlations using predictive modeling. This would allow, for example, the targeted content administrator 120 to correlate targeted content with a specific cookie name-value pair that the system may have never encountered before. However, regardless of how the correlation is defined, the user interface portion is configured to allow specific targeted content to be associated with specific users having specific cookie data stored on their computers. Based on such associations, the content delivery portion of the system can then deliver the specified content in real-time based on the presence of matching or similar cookie data associated with a future website visitor. FIG. 1B illustrates an example embodiment of how a website visitor computer 200 and a web server 210 can interact to deliver such targeted content. As will be appreciated in light of this disclosure, the reference to specific portions (such as data collection, content delivery, and user interface portions) is not intended to be structurally limiting or to otherwise imply any particular degree of modularity; rather, the various functionalities can be implemented with varying degrees of modularity and integration.

In one embodiment, the system can be hosted on a given website and implemented, for instance, using JavaScript or another suitable browser-based technology. In operation, the system is able to read and evaluate eligible cookies on the browser of a given visitor to the website. Information about the data contained in, and the structure of, a visitor's cookies can be transmitted in real-time to a targeted content administrator where it is organized and exposed to marketers. The marketers can then use the collected cookie data as the basis for specifying what content should be shown to visitors of a given website. The functionality of the targeted content administrator can be integrated into an online marketing tool that is capable of designing test pages and preforming A/B and/or multivariate testing of such pages to determine which content is most likely to optimize revenue generation for a particular audience segment. One example of such a tool is the Test&Target™ digital marketing tool provided by Adobe Systems Incorporated of San Jose, Calif. For example, the correlations established by the targeted content administrator can be based on the existing behavioral modeling system inside Test&Target™. Specifically, cookie data passed to Test&Target™ (or another comparable or competing marketing tool) as described herein can be used to evaluate what, if any, content should be assigned to that cookie data. When there is a sufficient match between a given visitor's cookie data and targeting criteria specified, the appropriate content can then be returned to the visitor's browser.

System Architecture

FIG. 1A is a block diagram schematically illustrating selected components of a system for analyzing information contained in browser cookies and correlating that information with selected web content in accordance with an embodiment of the present invention. Once such a correlation is established, the targeted content can then be delivered to future website visitors whose computers store browser cookies containing data identified as being correlated with such targeted content. FIG. 1B is a block diagram schematically illustrating selected components of a system for delivering targeted content to a website visitor in accordance with an embodiment of the present invention. FIG. 1C is a block diagram schematically illustrating selected components of a system for analyzing information contained in browser cookies associated with a website visitor, correlating that information with selected web content, and delivering targeted content to the website visitor in accordance with an embodiment of the present invention. Various components of these example embodiments will be provided in turn.

Referring now to the example embodiment illustrated in FIG. 1A, the initial process of collecting, analyzing and correlating browser cookie information can be seen as a sequence of interactions between a website visitor computer 100, a web server 110 and a targeted content administrator 120. In this example, the website visitor computer 100 uses a web browser 102 to send the web server 110 a request 105 to retrieve certain content 112 that is stored on the web server 110. In response to such a request, the web server 110 serves the requested content 112 to the web browser 102. As shown in FIG. 1A, the requested content 112 includes a programming element 114, such as a JavaScript element. The programming element 114 is configured to collect certain information, such as name-value pair data and/or URL data, that is stored in certain browser cookies 104 that are saved on the computer used by the website visitor computer 100. Specifically, when the content 112 is processed by and displayed in the web browser 102, the programming element 114 collects and transmits such browser cookie data 106 to the targeted content administrator 120, where it can be saved in browser cookie data repository 126. The targeted content administrator 120 also includes a user interface 122 that allows an administrative user to selectively create associations between the data stored in the browser cookie data repository 126 and web content stored in a targeted content repository 124, as will be discussed in turn.

The creation of such associations between the browser cookie data and the targeted content facilitates the subsequent delivery of such content to a targeted user or audience. Thus, also disclosed herein are techniques for delivering targeted content to a particular user or audience based on such associations. As illustrated in FIG. 1B, such techniques can be seen as a sequence of interactions between a website visitor computer 200, a web server 210 and the aforementioned targeted content administrator 120. As indicated by the use of different reference numerals, the website visitor computer 200 and web server 210 may be different entities than the website visitor computer 100 and the web server 110, respectively, which are illustrated in FIG. 1A. In such embodiments the website visitor computer 200 uses a web browser 202 to send the web server 210 a request 205 to retrieve certain content 212 stored thereon. The request 205 includes a copy of a selected browser cookie 204' saved on the computer used by the website visitor computer 200. For example, where the web server 210 is associated with the domain example.org, the content retrieval request 205 may include a cookie 204' that includes the URL example.org.

Still referring to the example embodiment illustrated in FIG. 1B, the requested content 212 includes a marketing box 216. A marketing box, also sometimes referred to as an "mbox", is a software component that enables content stored at a remote location to be received, provided and displayed. In this case, the marketing box 216 serves as a placeholder for targeted content which is to be retrieved from the targeted content repository 124. Thus, the marketing box 216 may include a programming element configured to send the targeted content administrator 120 a request 218 that includes cookie data 204" extracted from browser cookie 204'. The targeted content administrator 120 uses the previously generated correlations between browser cookie data and targeted content stored in the targeted content repository 124 to identify targeted content 124' that is appropriate for the website visitor computer 200 based on the cookie data 204". The targeted content administrator 120 then sends the identified targeted content 124' to the web server 210, where it is incorporated into marketing box 216. The web server 210 then sends requested content 212, which now includes the identified targeted content 124', to the web browser 202 associated with the website visitor computer 200.

FIGS. 1A and 1B illustrate example processes for collecting information contained in browser cookies, correlating such information with targeted content and then delivering that targeted content to future website visitors. However, such processes can also be implemented in the context of a single website visitor, wherein the cookie data that is collected and analyzed originates from the same website visitor to which the targeted content is delivered. For example, FIG. 1C illustrates a modified methodology that can be seen as a series of interactions between a website visitor computer 300, a web server 310 and the aforementioned targeted content administrator 120. In such embodiments the website visitor computer 300 uses a web browser 302 to send the web server 310 a request 305 to retrieve certain content 312 stored thereon. In response to such request, the web server 310 serves the requested content 312 to the website visitor computer 300. The content 312 includes a programming element configured to extract cookie data 304" from one or more browser cookies 304 stored on a computer associated with the website visitor computer 300. The programming element is further configured to send the targeted content administrator 120 a targeted content request 306 that includes the extracted cookie data 304". The targeted content administrator 120 uses previously generated correlations between matching or similar browser cookie data and targeted content stored in the targeted content repository 124 to identify targeted content 124' that is appropriate for the website visitor computer 300 based on the cookie data 304". The targeted content administrator 120 then sends the identified targeted content 124' to the marketing box 318, where it is incorporated into the content 312 that was received from the web server 310. Thus the website visitor computer 300 is presented with a single webpage that includes both the requested content 312 received from the web server 310, as well as the targeted content 124' received from the targeted content administrator 120.

The various embodiments described herein can be embodied in and/or otherwise operate in conjunction with a wide range of different types of computer systems, including desktop computers, laptop computers and mobile computing devices such as mobile phones and tablet computers. Such computer systems may include, for example, a processor, a memory and other components configured to meet the computational demands of the various methodologies disclosed herein. In addition, while the various embodiments are described in the context of website visitor and a web server, it will be appreciated that other embodiments can be implemented in other contexts where delivery of targeted content is useful, such as in the context of a retail point-of-sale environment, an online videogame environment, a television broadcast, or any other suitable digital media setting. Thus, it should be understood that the web-based implementations described herein represent just one application for the various features of the claimed invention, and that such features can also be implemented in other applications as well. The network 150 illustrated in the example embodiments of FIGS. 1A through 1C provides a medium for communications between the website visitors, the web servers and the targeted content administrator; it may be a public and/or private network, such as a private local area network operatively coupled to a wide area network such as the Internet. The connections between the website visitors, the web servers and the targeted content administrator may be wired, wireless or some combination of wired and wireless connections. In some cases, access to computing resources on a given network may require credentials such as usernames and passwords or any other suitable security mechanism.

As will be further appreciated in light of this disclosure, the various components and modules of the disclosed system, such as the user interface 122 provided by the targeted content administrator 120, the programming element 114 and the marketing boxes 216/316, can be implemented in software, such as a set of instructions encoded on a suitable computer readable medium that, when executed by one or more processors, cause the various methodologies provided herein to be carried out. The instructions can be encoded using a suitable programming language, such as C, C++, object-oriented C, JavaScript or BASIC, or alternatively, using custom or proprietary instruction sets. The computer-readable medium may be a non-transient storage medium suitable for storing digital information, such as a hard drive, a server, flash memory and/or random access memory. In alternative embodiments, the components and/or modules can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the functionality described herein. It will be apparent that any suitable combination of hardware, software and firmware can be used.

Methodology and User Interface

FIGS. 2A and 2B collectively illustrate one embodiment of a browser cookie analysis and targeted content delivery methodology. As can be seen, this example methodology includes a number of phases and sub-processes, the sequence of which may vary from one embodiment to the next. However, when considered in the aggregate, these phases and sub-processes form a complete browser cookie analysis and targeted content delivery function that is responsive to user commands in accordance with certain embodiments disclosed herein. This methodology and its variants can be implemented, for example, using the system architecture illustrated in FIGS. 1A and 1B and described above, although other systems and architectures can be used in other embodiments, as will be apparent in light of this disclosure. To this end, the correlation of the various functions shown in FIGS. 2A and 2B to specific users or systems shown in FIGS. 1A and 1B is not intended to imply any structural and/or use limitations. Rather, other embodiments may include, for example, varying degrees of integration where multiple functionalities are effectively performed by one user or system, such as where a web server also includes a targeted content repository, a browser cookie data repository, and/or a user interface configured to provide the various functionalities associated with the example components illustrated in FIGS. 1A and 1B. Thus, other embodiments may have fewer or more users and/or systems depending on the granularity of implementation. Numerous variations and alternative configurations will be apparent in light of this disclosure.

The functionality disclosed in this example embodiment is generally implemented in two phases. First, information stored in browser cookies is collected and compiled in a way that allows a targeted content administrator to selectively correlate such data with web content stored in a targeted content repository. Information can be collected from browser cookies saved in the computers of multiple website visitors. Once such information is correlated with targeted content, the targeted content can then be delivered to future website visitors whose computers store browser cookies containing the same or similar browser cookie data. The targeted content may be delivered to website visitors who are different from or who are the same as the website visitors from which the browser cookie information was initially collected.

Referring now to FIGS. 1A and 2A, one embodiment of a method for collecting browser cookie data from a website visitor is illustrated. This example method can be seen as a series of interactions between website visitor computer 100, web server 110 and targeted content administrator 120. The method commences with the website visitor computer 100 sending the web server 110 a content retrieval request 105. The content retrieval request 105 may be performed by, for example, clicking on a hyperlink in a page displayed using web browser 102, typing a URL into an address bar of web browser 102, or any other appropriate technique for navigating to a desired webpage. The website visitor computer 100 may or may not have retrieved content from the particular web server 110 previously. In response to the content retrieval request 105, the web server 110 serves the requested content 112 to the website visitor computer 100, for example using standard HTTP communication techniques.

As illustrated in FIG. 1A, embedded within the requested content 112 served to the website visitor computer 100 is a programming element 114, such as a JavaScript element. When the requested content 112 is processed by and displayed in the web browser 102, the programming element 114 causes information stored in certain browser cookies 104 saved on the computer used by the website visitor computer 100 to be collected and sent to targeted content administrator 120. In one embodiment, for example, the programming element 114 can be configured to selectively collect and transmit browser cookie data 106 contained within pre-designated browser cookies 104 saved on the computer used by the website visitor computer 100. Such a pre-designation may be based on, for example, particular browser cookies which are known to include data which can readily be parsed, understood and used by the targeted content administrator 120. The collected browser cookie data 106 may include, for example, name-value pair data and/or URL data. The process of collecting the browser cookie data 106 and transmitting it to the targeted content administrator 120 is optionally performed using client-side scripting that is transparent to the website visitor computer 100, and thus does not detract from the consumption of the requested content 112. This configuration advantageously allows cookie data to be automatically collected as a result of normal website visitor traffic. In modified embodiments cookie data can additionally or alternatively be received from other sources, such as third-party aggregators of cookie data.

Figure 3A:
FIG. 3A illustrates an example user interface control panel that can be used to define browser cookie data that is to be correlated with selected web content, in accordance with an embodiment of the present invention.
Figure 3B:
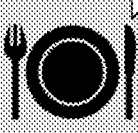
FIG. 3B illustrates an example user interface control panel that can be used to select web content that is to be correlated with previously defined browser cookie data, in accordance with an embodiment of the present invention.

Upon receiving the cookie data 106, the targeted content administrator 120 stores such data in browser cookie data repository 126. The browser cookie data repository 126 can be provided with any suitable data structure that allows the data contained therein to be extracted and viewed using a targeted content administrator user interface 122. In one embodiment, the user interface includes a first user interface control panel 122a that allows a user to select browser cookie data that is to be correlated with selected web content, and a second user interface control panel 122b that allows a user to select the web content that is to be correlated with previously defined browser cookie data. Examples of such first and second user interface control panels are illustrated in FIGS. 3A and 3B, respectively. These user interface control panels can be used to define associations between the collected browser cookie data and web content stored in targeted content repository 124.

The example user interface control panel 122a illustrated in FIG. 3A is configured to allow a user to define a custom segment that is to be correlated with selected web content. As used herein, the term "custom segment" refers to a segment of website visitors that meet one or more user-defined criteria. For example, a custom segment might comprise website visitors who have used a search engine to check airfares to Hawaii, website visitors who have browsed content hosted by the domain example.org, or website visitors who have browser cookies containing a certain name-value pair saved on their computers. Other custom segments might include website visitors meeting multiple such criteria. The example user interface control panel 122a can be used to define a custom segment via one or more drop-down menu boxes, although other user interface controls such as radio buttons, selection lists and/or control sliders can be used in other embodiments. In such embodiments, the drop-down menu boxes can be used to display a list of cookie parameters and values extracted from the cookie data stored in the browser cookie data repository 126. The drop-down menu boxes can also be used to define certain relationships between the selected parameters and values, such as "equals", "contains", "does not contain", "approximates", and so forth. For instance, FIG. 3A illustrates how such drop-down menu boxes can be used to define a custom segment comprising website visitors who have browsed web content hosted by the domain example.net.

It will be appreciated that the particular parameters, relationships and values illustrated in FIG. 3A are provided only for purposes of illustration, and that the claimed invention is not intended to be limited to any particular set of options available via the user interface control panel 122a. For example, in a modified embodiment the user interface control panel 122a optionally further provides functionality to view and define custom segments using the actual cookie data stored in the repository 126, in contrast to generalized data compiled in the drop-down menu boxes. In addition, the user interface control panel 122a can also optionally be used to define a custom segment having multiple conditions by using the "Add Condition" button before saving the full definition of the custom segment via the "Save" button.

Once a custom segment has been defined, content stored within targeted content repository 124 can be selected as being correlated with that custom segment. Such a correlation can be defined, for example, using the user interface control panel 122b illustrated in FIG. 3B. The content selected as being correlated with the custom segment may comprise a content segment appropriate for inclusion within existing content stored on web server 110, such as within a marketing box, as will be described in turn. Examples of such a content segment include banner advertisements, sidebar advertisements and any other content segment appropriate for inclusion within a larger content item, such as within a web page. The example user interface control panel 122b displays one or more possible content segments available in the targeted content repository 124. Such content selections are often referred to as "test pages", although the content segment may not necessarily correspond to a web page or an entire web page. For example, in the example embodiment illustrated in FIG. 3B, the user has designated Test Page B as being correlated with the custom segment "URL-3 equals example.net".

While the example user interface control panel 122b is illustrated as displaying a selection of one out of four possible test pages, it will be appreciated that a custom segment can be correlated with multiple test pages available within the targeted content repository 124. Furthermore, where a large number of test pages are available to choose from, such test pages can be accessed using any suitable user interface control, such as scroll bars or hyperlinks. The available test pages can be displayed graphically, such as with a thumbnail view as illustrated in FIG. 3B, or can be displayed textually, such as in an alphabetically-indexed listing or in a directory tree structure. A textual listing can be based on, for example, subject matter keywords associated with the targeted content. In embodiments where a textual listing of test pages is implemented, a content preview function is optionally provided.

The example embodiment illustrated using the user interface control panels of FIGS. 3A and 3B involves first defining the custom segment and then selecting the content which is to be correlated with that custom segment. However, it will be appreciated that this particular sequence is not critical and that, in other embodiments, the content to be correlated can be selected before the custom segment is defined. Thus the invention is not intended to be limited to any particular sequence of defining the custom segment and selected the content which is to be correlated with that custom segment. The targeted content administrator user interface 122 optionally includes one or more additional control panels that can be used to delete, modify and/or perform other management operations with respect to previously-defined correlations.

Furthermore, while the user interface control panels of FIGS. 3A and 3B illustrate certain embodiments for establishing a user-defined correlation between a custom segment and targeted content, it will be appreciated that other automated or semi-automated techniques for establishing such correlations can also be implemented. For example, in certain embodiments web traffic information obtained from external sources can be used to predict which content stored within the targeted content repository 124 would be appropriate to associate with certain name-value pairs and/or URLs contained within the browser cookie data repository 126. Additionally or alternatively, a user's correlations as defined using the user interface control panels 122a. 122b can be used to predict how other cookie data might be correlated with content stored in the targeted content repository 124. Regardless of how such predictions are generated, they can be presented to the user as a suggested correlation between a custom segment and particular targeted content stored in the repository 124. Such predictions can also be used to automatically generate correlations that are subsequently used by the targeted content administrator 120 to match cookie data stored in repository 126 with targeted content stored in repository 124. The predictive modeling techniques referred to herein can be provided, for example, using the aforementioned Test&Target™ digital marketing tool.

Referring now to FIGS. 1B and 2B, one embodiment of a method of delivering targeted content to a particular user or audience based on one or more of the correlations defined between cookie data stored in repository 126 and targeted content stored in repository 124 is illustrated. This example method can be seen as a series of interactions between website visitor computer 200, web server 210 and targeted content administrator 120. As indicated by the use of different reference numerals, website visitor computer 200 and web server 210 are optionally different entities than the website visitor computer 100 and the web server 110, respectively, which are illustrated in FIG. 1A. Thus, in certain embodiments the targeted content is delivered to a different website visitor than the website visitor from which the cookie data 106 was initially collected. This advantageously allows the underlying correlations to be based on web traffic data that is potentially broader-based than a relatively smaller number of website visitors to which targeted content is actually delivered. Use of a broad base of web traffic data allows more accurate correlations to be established between the browser cookie data and the targeted content.

The content delivery method of FIGS. 1B and 2B commences with the website visitor computer 200 sending the web server 210 a request 205 to retrieve certain content 212 stored on the web server 210. The content retrieval request 205 may be invoked by, for example, clicking on a hyperlink in a page displayed using web browser 202, typing a URL into an address bar of web browser 202, or any other appropriate technique for navigating to a desired webpage. The content retrieval request 205 optionally includes one or more browser cookies 204' selected from amongst a plurality of browser cookies 204 stored on a computer used by the website visitor computer 200. The browser cookie 204' can be selected, for example, based on a correspondence between a URL associated with the web server 210 and a URL stored within the browser cookie 204'.

As illustrated in FIG. 1B, the requested content 212 includes a marketing box 216 which serves as a placeholder for targeted content which is to be retrieved from the targeted content repository 124. In such embodiments the marketing box 216 includes a programming element configured to extract data from one or more selected browser cookies 204' which may have been received with the content retrieval request 205. The programming element is further configured to send the extracted browser cookie data 204" to the targeted content administrator 120 as part of a targeted content request 218. Thus, in this case, the marketing box 216 is specifically configured to be compatible with the targeted content administrator 120 from which the targeted content is to be retrieved.

Upon receiving the targeted content request 218, the targeted content administrator 120 uses the previously generated correlations between browser cookie data stored in repository 126 and targeted content stored in repository 124 to identify targeted content 124' that is appropriate for the website visitor computer 200. Whether the targeted content 124' is considered "appropriate" can be based on, for example, the cookie data 204"received from the marketing box 216. For example, where cookie data containing the URL example.net has previously been correlated with targeted content comprising an advertisement for an Italian restaurant, then subsequent receipt of cookie data 204" containing the URL example.net will cause the advertisement for the Italian restaurant to be identified as appropriate targeted content 124'. As indicated previously with respect to FIG. 3A, the received cookie data 204" need not correspond exactly to a cookie value specified in a previously defined custom segment, but may approximate or otherwise fall within a user-defined range. In cases where no content is identified as being appropriate for the received cookie data 204", the targeted content administrator 120 can be configured to send the web server a default test page, a randomly-selected test page, or a test page that is selected based on a proximity algorithm with respect to the received cookie data 204". For example, using the aforementioned predictive modeling techniques can enable the targeted content administrator 120 to select targeted content that is predicted to be appropriate even in situations where the received cookie data 204" does not exactly match or otherwise correspond to cookie data 106 previously received from website visitors, as illustrated in FIG. 1A.

Once certain targeted content 124' is identified as being an appropriate match to the received cookie data 204", such targeted content 124' is returned to the web server 210 from which the targeted content request 218 was initially sent. The web server 210 incorporates the targeted content 124' into the content 212 that was originally requested by the website visitor computer 200. Such incorporation can be accomplished, for example, by inserting the targeted content 124' into a marketing box 216 that forms pan of the requested content 212, thereby enabling the targeted content 124' to appear in a webpage element such as a banner advertisement, a sidebar advertisement, or any other suitable page element. Once the targeted content 124' has been incorporated into the requested content 212, the web server 210 serves the requested content 212 to the website visitor computer 200, for example using standard HTTP communication techniques. When the website visitor computer 200 views the requested content using web browser 202, the website visitor sees the targeted content 124' as being incorporated into the requested content 212. Thus, two different website visitors having two different sets of browser cookie data saved on their respective computers may see different targeted content appear in the same webpage served from the same web server. The systems and methods disclosed herein advantageously allow the content presented to the website visitor to be more specifically tailored to the browsing history of that website visitor, and allow such customized content to be dynamically generated on a real-time bases as a website visitor browses webpages.

An alternative embodiment of a browser cookie analysis and targeted content delivery methodology is illustrated in FIG. 2C. As can be seen, this example methodology includes a number of phases and sub-processes, the sequence of which may vary from one embodiment to the next. However, when considered in the aggregate, these phases and sub-processes form a complete browser cookie analysis and targeted content delivery function that is responsive to user commands in accordance with certain embodiments disclosed herein. This methodology and its variants can be implemented, for example, using the system architecture illustrated in FIG. 1C and described above, although other systems and architectures can be used in other embodiments, as will be apparent in light of this disclosure. To this end, the correlation of the various functions shown in FIG. 2C to specific users or systems shown in FIG. 1C is not intended to imply any structural and/or use limitations. Rather, other embodiments may include, for example, varying degrees of integration where multiple functionalities are effectively performed by one user or system. Numerous variations and alternative configurations will be apparent in light of this disclosure.

As illustrated in FIGS. 1C and 2C, this alternative embodiment can be seen as a series of interactions between website visitor computer 300, web server 310 and targeted content administrator 120. This example method commences with the website visitor computer 300 sending the web server 310 a request 305 to retrieve certain content 312 that is stored on the web server 310. The content retrieval request 305 may be invoked by, for example, clicking on a hyperlink in a page displayed using web browser 302, typing a URL into an address bar of web browser 302, or any other appropriate technique for navigating to a desired webpage. As illustrated in FIG. 1C, the requested content 312 includes a marketing box 318 which serves as a placeholder for targeted content which is to be retrieved from the targeted content administrator 124. In such embodiments the marketing box 318 includes a programming element that, when content 312 is rendered in web browser 302, is configured to extract data from one or more browser cookies 304 stored on a computer associated with the website visitor computer 100. The programming element is further configured to send the extracted browser cookie data 304" to the targeted content administrator 120 as part of a targeted content request 306.

Upon receiving the targeted content request 306, the targeted content administrator 120 uses previously generated correlations between matching or similar browser cookie data and targeted content stored in the targeted content repository 124 to identify targeted content 124' that is appropriate for the website visitor computer 300 based on the cookie data 304". The targeted content administrator 120 can alternatively be configured to generate a new correlation between the cookie data 304" and appropriate targeted content in response to the request 306 initiated by the marketing box 318. Thus the correlation between the cookie data 304" and the appropriate targeted content 124' may be created in response to the targeted content request 306. As indicated previously with respect to FIG. 3A, the received cookie data 304" need not correspond exactly to a cookie value specified in a previously defined custom segment, but may approximate or otherwise fall within a user-defined range. For example, predictive modeling techniques enable the targeted content administrator 120 to select targeted content that is predicted to be appropriate even in situations where the received cookie data 304" does not exactly match or otherwise correspond to cookie data 304".

Once certain targeted content 124' is identified as being an appropriate match to the received cookie data 304", such targeted content 124' is returned to the website visitor computer 300. More specifically, the targeted content 124' is returned to the marketing box 318 that forms part of the content 312 received from the web server 310. In such embodiments the marketing box 318 can be configured to incorporate the targeted content 124' into the content 312, thereby enabling the targeted content 124' to appear in a webpage element such as a banner advertisement, a sidebar advertisement, or any other suitable page element. When the website visitor computer 300 views the requested content using web browser 302, the website visitor sees the targeted content 124' as being incorporated into the requested content 312. Thus, two different website visitors having two different sets of browser cookie data saved on their respective computers may see different targeted content appear in the same webpage served from the same web server. Such systems and methods advantageously allow the content presented to the website visitor to be more specifically tailored to the browsing history of that website visitor, and allow such customized content to be dynamically generated on a real-time basis as a website visitor browses webpages.

CONCLUSION

Numerous variations and configurations will be apparent in light of this disclosure. For instance, one example embodiment provides a browser cookie analysis system that comprises a programming element stored on a web server. The programming element is configured to extract data from a browser cookie that is associated with a website visitor. The method further comprises a targeted content administrator that includes a targeted content repository and a browser cookie data repository. The targeted content administrator is configured to receive the data extracted from the browser cookie and save said data in the browser cookie data repository. The targeted content administrator is further configured to establish a correlation between selected content stored in the targeted content repository and selected browser cookie data stored in the browser cookie data repository. In some cases, the programming element is further configured to be sent from the web server to a browser of the website visitor in response to a content retrieval request sent from the website visitor to the web server. In some cases, the targeted content administrator is further configured to (a) receive a targeted content request from a second web server, the targeted content request including detected cookie data; and (b) send targeted content to the second web server based on an existing correlation between the targeted content and the detected cookie data. In some cases, the programming element is a JavaScript element. In some cases, the browser cookie analysis system further comprises a marketing box embedded within web content stored on a second web server, wherein (a) the marketing box is configured to receive targeted content from the targeted content administrator; (b) the second web server is configured to transmit the web content, including the received targeted content, to a second website visitor; and (c) the second website visitor is associated with cookie data that is correlated with the targeted content. In some cases, the programming element is configured to extract data from a plurality of browser cookies associated with the website visitor. In some cases, the extracted data is selected from the group consisting of a name-value pair and a uniform resource locator. In some cases, the targeted content administrator is configured to receive data extracted from browser cookies associated with a plurality of website visitors. In some cases, the targeted content administrator further includes a user interface through which the correlation can be established.

Another example embodiment of the present invention provides a browser cookie analysis methodology that comprises saving browser cookie data that is collected from a plurality of website visitors in a browser cookie data repository hosted by a targeted content administrator. The methodology further comprises establishing a correlation between selected browser cookie data stored in the browser cookie data repository and selected web content that is saved in a targeted content repository that is also hosted by the targeted content administrator. The methodology further comprises receiving a targeted content request from a web server, the targeted content request including detected cookie data. The methodology further comprises sending targeted web content to the web server based on an existing correlation between the targeted content and the detected cookie data. In some cases, the browser cookie data is collected from the plurality of website visitors by a programming element that is served to a corresponding browser for each of the plurality of website visitors. In some cases, the browser cookie data is collected from the plurality of website visitors by a programming element that is served to a corresponding browser for each of the plurality of website visitors in response to a content retrieval request. In some cases, establishing the correlation further comprises providing a user interface that includes a custom segment definition control panel and a targeted content selection control panel. In some cases, establishing the correlation further comprises selecting a browser cookie parameter from a drop-down menu listing a plurality of browser cookie parameters associated with browser cookie data stored in the browser cookie data repository. In some cases, the browser cookie analysis further comprises (a) incorporating the targeted web content into a marketing box that is embedded within a webpage hosted by the web server; and (b) serving the webpage, including the targeted content, to a selected website visitor.

Another example embodiment of the present invention provides a non-transient computer readable medium having instructions encoded thereon that, when executed by one or more processors causes a browser cookie analysis process to be carried out. The process comprises saving browser cookie data that is collected from a plurality of website visitors in a browser cookie data repository hosted by a targeted content administrator. The process further comprises establishing a correlation between selected browser cookie data stored in the browser cookie data repository and selected web content that is saved in a targeted content repository that is also hosted by the targeted content administrator. The process further comprises receiving a targeted content request from a web server, the targeted content request including detected cookie data. The process further comprises sending targeted web content to the web server based on an existing correlation between the targeted content and the detected cookie data. In some cases, the browser cookie analysis process further comprises serving a programming element to a corresponding browser for each of the plurality of website visitors, each programming element being configured to collect the browser cookie data from the plurality of website visitors. In some cases, the browser cookie data stored in the browser cookie data repository includes data selected from the group consisting of a name-value pair and a uniform resource locator. In some cases, establishing the correlation further comprises selecting the selected web content from a plurality of available web content segments presented in a targeted content selection control panel. In some cases, the browser cookie analysis process further comprises (a) incorporating the targeted web content into a marketing box that is embedded within a webpage hosted by the web server; and (b) serving the webpage, including the targeted content, to a selected website visitor.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A browser cookie analysis methodology, comprising:
   saving browser cookie data that is collected from a plurality of website visitors in a browser cookie data repository hosted by a targeted content administrator;
   establishing a correlation between selected browser cookie data stored in the browser cookie data repository and selected web content that is saved in a targeted content repository that is also hosted by the targeted content administrator, wherein
      the correlation is established based on user input received via a user interface generated by the targeted content administrator,
      the user input defines a custom segment that includes a browser cookie parameter, a browser cookie value, and one or more relationships between the browser cookie parameter and the browser cookie value,
      the browser cookie parameter is selected from a plurality of browser cookie parameters stored in the browser cookie data repository,
      the browser cookie value is selected from a plurality of browser cookie values stored in the browser cookie data repository,
      the one or more relationships between the browser cookie parameter and the browser cookie value include at least one of "equals", "contains", "excludes", and "approximates", and
      the user input further identifies the selected web content that is saved in the targeted content repository, and that is associated with the defined custom segment;
   saving a definition of the custom segment via the targeted content administration user interface; and
   receiving a targeted content request from a web server, the targeted content request including detected cookie data; and
   sending the selected web content to the web server based on a determination that the detected cookie data satisfies the defined custom segment.

2. The browser cookie analysis methodology of claim 1, wherein the browser cookie data is collected from the plurality of website visitors by a programming element that is served to a corresponding browser for each of the plurality of website visitors.

3. The browser cookie analysis methodology of claim 1, wherein the browser cookie data is collected from the plurality of website visitors by a programming element that is served to a corresponding browser for each of the plurality of website visitors in response to a content retrieval request.

4. The browser cookie analysis methodology of claim 1, wherein the user interface includes
   a custom segment definition control panel through which the browser cookie parameter and the browser cookie value are selected, and
   a targeted content selection control panel through which the selected web content is identified.

5. The browser cookie analysis methodology of claim 1, wherein establishing the correlation further comprises selecting the browser cookie parameter from a drop-down menu listing the plurality of browser cookie parameters stored in the browser cookie data repository.

6. The browser cookie analysis methodology of claim 1, further comprising:
   incorporating the selected web content into a marketing box that is embedded within a webpage hosted by the web server; and
   serving the webpage, including the selected content, to a selected website visitor.

7. A non-transient computer readable medium having instructions encoded thereon that, when executed by one or more processors causes a browser cookie analysis process to be carried out, the process comprising:
   saving browser cookie data that is collected from a plurality of website visitors in a browser cookie data repository hosted by a targeted content administrator;
   establishing a correlation between selected browser cookie data stored in the browser cookie data repository and selected web content that is saved in a targeted content repository that is also hosted by the targeted content administrator, wherein
      the correlation is established based on user input received via a user interface generated by the targeted content administrator,
      the user input defines a custom segment that includes a browser cookie parameter, a browser cookie value, and one or more relationships between the browser cookie parameter and the browser cookie value, the browser cookie parameter is selected from a plurality of browser cookie parameters stored in the browser cookie data repository, the browser cookie value is selected from a plurality of browser cookie values stored in the browser cookie data repository, the one or more relationships between the browser cookie parameter and the browser cookie value include at least one of "equals", "contains", "excludes", and "approximates", and the user input further identifies the selected web content that is saved in the targeted content repository, and that is associated with the defined custom segment;

saving a definition of the custom segment via the targeted content administration user interface;

receiving a targeted content request from a web server, the targeted content request including detected cookie data; and sending the selected web content to the web server based on an existing correlation between the targeted content and the a determination that the detected cookie data satisfies the defined custom segment.

8. The non-transient computer readable medium of claim 7, wherein the browser cookie analysis process further comprises serving a programming element to a corresponding browser for each of the plurality of website visitors, each programming element being configured to collect the browser cookie data from the corresponding browser.

9. The non-transient computer readable medium of claim 7, wherein the browser cookie data stored in the browser cookie data repository includes data selected from a group consisting of a name-value pair and a uniform resource locator.

10. The non-transient computer readable medium of claim 7, wherein establishing the correlation further comprises identifying the selected web content from a plurality of available web content segments presented in a targeted content selection control panel.

11. The non-transient computer readable medium of claim 7, wherein the browser cookie analysis process further comprises:
   incorporating the selected web content into a marketing box that is embedded within a webpage hosted by the web server; and
   serving the webpage, including the selected content, to a selected website visitor.

12. A browser cookie analysis system, comprising:
   a storage device;
   a targeted content repository;
   a browser cookie data repository that contains data extracted from a plurality of browser cookies that are associated with a corresponding plurality of website visitors;
   a programming element stored on a web server, the programming element configured to extract data from a first browser cookie that is associated with a first website visitor; and
   a processor operatively coupled to the storage device, the processor configured to execute instructions that are stored in the storage device, and that, when executed, cause the processor to carry out a browser cookie analysis process that comprises:
      receiving the data extracted from the plurality of browser cookies that are associated with the plurality of website visitors and save said data in the browser cookie data repository;
      establishing a correlation between selected content stored in the targeted content repository and selected browser cookie data stored in the browser cookie data repository, wherein
         the correlation is established based on user input received via a targeted content administration user interface,
         the user input defines a custom segment that includes a browser cookie parameter, a browser cookie value, and one or more relationships between the browser cookie parameter and the browser cookie value,
         the browser cookie parameter is selected from a plurality of browser cookie parameters stored in the browser cookie data repository,
         the browser cookie value is selected from a plurality of browser cookie values stored in the browser cookie data repository,
         the one or more relationships between the browser cookie parameter and the browser cookie value include at least one of "equals", "contains", "excludes", and "approximates", and
         the user input further identifies the selected content that is stored in the targeted content repository, and that is associated with the defined custom segment;
      saving a definition of the custom segment via the targeted content administration user interface; and
      sending the selected content to a second website visitor upon receipt of browser cookie data that satisfies the defined custom segment.

13. The browser cookie analysis system of claim 12, wherein the browser cookie data that satisfies the defined custom segment is received from a browser of the second website visitor.

14. The browser cookie analysis system of claim 12, wherein the programming element is further configured to be sent from the web server to a browser of the first website visitor in response to a content retrieval request sent from the browser of the first website visitor to the web server.

15. The browser cookie analysis system of claim 12, wherein the programming element is a JavaScript element.

16. The browser cookie analysis system of claim 12, further comprising a marketing box embedded within web content that is rendered in a browser of the second website visitor, wherein the marketing box is configured to display the selected content.

17. The browser cookie analysis system of claim 12, wherein the programming element is further configured to extract data from a plurality of browser cookies associated with the first website visitor.

18. The browser cookie analysis system of claim 12, wherein the data extracted from the browser cookie that is associated with the first website visitor is selected from a group consisting of a name-value pair and a uniform resource locator.

* * * * *

UNITED STATES PATENT AND TRADEMARK OFFICE
CERTIFICATE OF CORRECTION

| | | |
|---|---|---|
| PATENT NO. | : 9,210,222 B2 | Page 1 of 1 |
| APPLICATION NO. | : 13/799733 | |
| DATED | : December 8, 2015 | |
| INVENTOR(S) | : Kimen Catherine Field | |

It is certified that error appears in the above-identified patent and that said Letters Patent is hereby corrected as shown below:

In the Claims

Column 16, lines 14-15, Claim 1, please replace "targeted content administration user interface; and" with --targeted content administrator user interface;--.

Column 17, lines 16-17, Claim 7, please replace "targeted content administration user interface;" with --targeted content administrator user interface;--.

Claim 17, lines 22-24, Claim 7, please replace "sending the selected web content to the web server based on an existing correlation between the targeted content and the a determination that the detected cookie data" with --"sending the selected web content to the web server based on a determination that the detected cookie data--.

Signed and Sealed this
Eighth Day of March, 2016

Michelle K. Lee
*Director of the United States Patent and Trademark Office*